(12) United States Patent
Dieckmann et al.

(10) Patent No.: US 9,597,932 B2
(45) Date of Patent: Mar. 21, 2017

(54) TIRE-PRESSURE ADJUSTING DEVICE FOR A TIRE INFLATION SYSTEM OF A VEHICLE

(71) Applicant: WABCO GmbH, Hannover (DE)

(72) Inventors: Thomas Dieckmann, Pattensen (DE); Frank Zielke, Barsinghausen (DE)

(73) Assignee: WABCO GMBH, Hannover (DE)

( * ) Notice: Subject to any disclaimer, the term of this patent is extended or adjusted under 35 U.S.C. 154(b) by 0 days.

(21) Appl. No.: 14/764,352

(22) PCT Filed: Jan. 8, 2014

(86) PCT No.: PCT/EP2014/000018
§ 371 (c)(1),
(2) Date: Jul. 29, 2015

(87) PCT Pub. No.: WO2014/117909
PCT Pub. Date: Aug. 7, 2014

(65) Prior Publication Data
US 2015/0360522 A1  Dec. 17, 2015

(30) Foreign Application Priority Data

Feb. 1, 2013  (DE) .................. 10 2013 001 758

(51) Int. Cl.
*B60C 23/00* (2006.01)
(52) U.S. Cl.
CPC .................. *B60C 23/003* (2013.01)
(58) Field of Classification Search
CPC .................. B60C 23/003; B60C 23/007
See application file for complete search history.

(56) References Cited

U.S. PATENT DOCUMENTS

| 1,915,161 | A | * | 6/1933 | Jordan | B60C 23/003 |
| | | | | | 137/556.6 |
| 2,156,841 | A | | 5/1939 | Davis | |
| 2,685,906 | A | * | 8/1954 | Williams | B60C 23/001 |
| | | | | | 137/224 |

(Continued)

FOREIGN PATENT DOCUMENTS

| DE | 10 2010 042 265 A1 | 4/2012 |
| EP | 1 051 302 B1 | 11/2000 |

*Primary Examiner* — Kip T Kotter
(74) *Attorney, Agent, or Firm* — Leydig, Voit & Mayer, Ltd.

(57) ABSTRACT

A tire-pressure adjusting device for a vehicle tire inflation system distributes a compressed-air supply to a plurality of pneumatic apparatuses each comprising a rotary transmitter and measures the tire pressures of vehicle tires connected to the rotary transmitters. The tire-pressure adjusting device includes a control apparatus for receiving a pressure measurement signal and for outputting control signals and a modulation valve apparatus for receiving the control signals and for pneumatically activating one of a plurality of connected rotary transmitters in order to fill and to measure the pressure of at least one vehicle tire connected to the rotary transmitter. The modulation valve apparatus includes a rotary valve, which has a control element that can be rotated into a plurality of rotational positions. The control element activates one of the plurality of pneumatic apparatuses in each of the rotational positions of the control element.

18 Claims, 8 Drawing Sheets

(56) References Cited

U.S. PATENT DOCUMENTS

| | | | | |
|---|---|---|---|---|
| 2,693,841 A | * | 11/1954 | Webster, Jr | ........... B60C 23/003 |
| | | | | 137/226 |
| 2,840,109 A | * | 6/1958 | Wadleigh | .............. F16K 11/085 |
| | | | | 137/625.11 |
| 2,989,989 A | | 3/1959 | Whaley et al. | |
| 5,193,581 A | | 3/1993 | Shiroto et al. | |
| 5,819,798 A | | 10/1998 | Claflin et al. | |

* cited by examiner

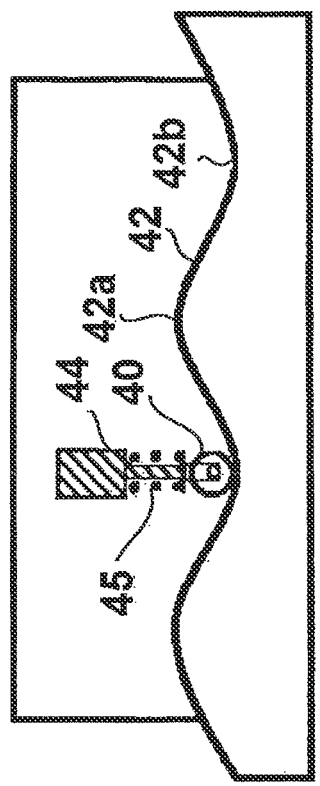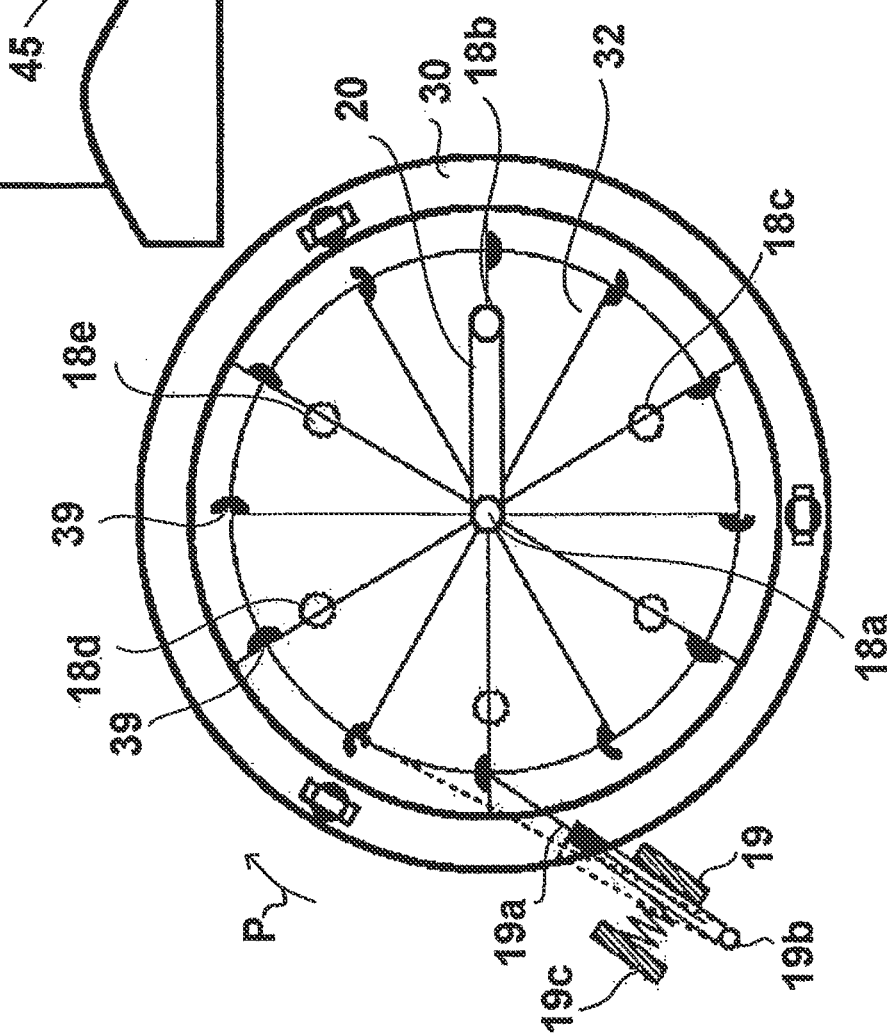
Fig. 5

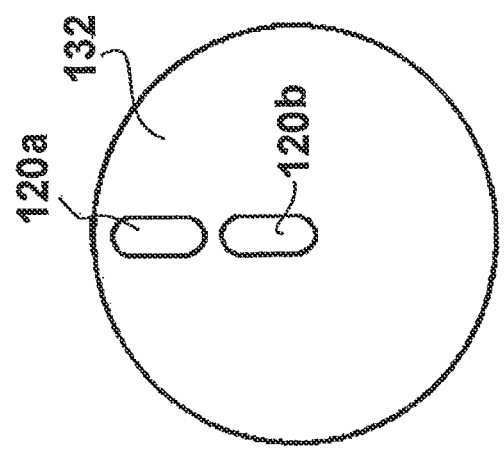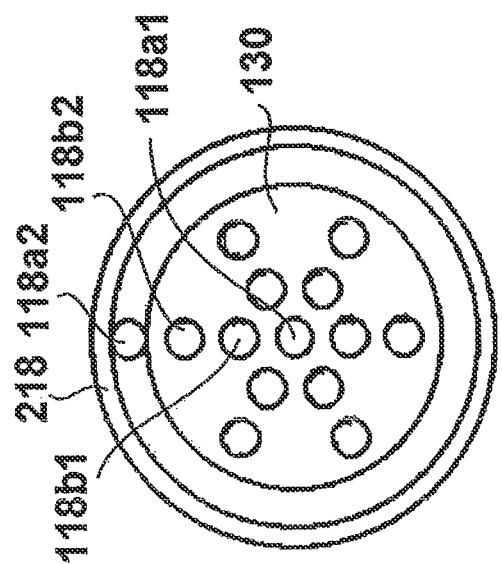
Fig. 8

TIRE-PRESSURE ADJUSTING DEVICE FOR A TIRE INFLATION SYSTEM OF A VEHICLE

FIELD OF THE INVENTION

The present invention generally relates to a tire pressure adjustment apparatus for a tire inflation system of a vehicle.

BACKGROUND OF THE INVENTION

EP 1 051 302 B1 describes a tire pressure adjustment apparatus of the general type under consideration. In particular, in the case of agricultural vehicles such as tractors, for example, the tire pressure can be checked and adjusted by the vehicle itself. For this purpose, in the region of the wheel connections or wheel rims, rotary transmitters allow compressed air at the tire pressure to be transmitted to the connected vehicle tires of the vehicle wheels. It is thus possible for the tire pressure to be checked and for compressed air to be replenished or discharged. The tire pressure adjustment apparatus generally has a compressed-air port for a compressed-air supply, an electronic control device, a modulator valve device actuated by way of the electronic control device, and a pressure sensor that is read out by the control device. Through corresponding actuation of the modulator valve device, a pressure transmitter can be connected, for inflation purposes, to the compressed-air supply and can be connected, for pressure measurement purposes, to the pressure sensor.

In the case of a relatively large number of wheels or axles, the number of valves required in the modulator valve device correspondingly greatly increases, which leads to considerable outlay in terms of apparatus, generally with multiple valve stages for the successive distribution of the compressed air. Correspondingly, the number of solenoid valves that must be supplied with electrical current by the control device increases.

Also, the design of the rotary transmitters for a reliable sealing-off action during tire inflation and tire pressure measurement and for reliable separation during normal operation of the vehicle generally requires a certain level of outlay in terms of circuitry. Reliable rotary transmitters are, in part, designed with a control port for the sealing-off action, that is, for pneumatic coupling, and an inflation port for inflation and pressure measurement, in order to prevent leaks and faults during inflation and pressure measurement. In the case of such a design with two ports, it is, in turn, generally possible to provide a pneumatic device—preferably in the vicinity of the axle or tire—between the modulation valve device and the rotary transmitter, and connected to the pneumatic connecting line passing from the modulation valve device. The pneumatic device initially applies a pressure shock to the control port and subsequently aerates the inflation port. Such additional pneumatic devices for the actuation of rotary transmitters are correspondingly associated with a considerable level of outlay in terms of hardware.

SUMMARY OF THE INVENTION

Generally speaking, it is an object of the present invention to provide a tire pressure adjustment apparatus for a tire inflation system of a vehicle that permits reliable tire inflation and pressure measurement with relatively little outlay.

According to an embodiment of the present invention, the modulation valve device, which is provided for selectively connecting the individual rotary transmitters to the inflation port and to the pressure sensor, has a rotary valve with a rotatable positioner. The rotatable positioner is adjustable into multiple rotational settings or positions in which it connects in each case the compressed-air port and/or the pressure sensor to one of the rotary transmitters.

According to embodiments of the present invention, instead of providing a cascade or series of electropneumatic valves, a single rotary valve is employed that permits a selective assignment or distribution by way of its multiple rotational settings. With a greater number of rotary transmitters for actuation, an increasing, possibly even exponentially increasing, number of solenoid valves must be provided. It will be appreciated that a rotary valve with multiple rotational settings for the selective connection of one of several outlet ports permits a considerable reduction in outlay in terms of valve hardware. The conventional complex modulation valve device, which is provided between the compressed-air supply and the external connecting lines leading to the rotary transmitters, can thus be replaced, for example, with one pilot control valve device with a relatively small number of pneumatic and electropneumatic valves and the rotary valve.

The entire tire pressure adjustment apparatus together with the rotary valve, an upstream pilot control valve device, a control device and a pressure sensor can be accommodated in a common housing, such that the electrical lines formed between the control device and the rotary valve and the pilot control valve device for the transmission of control signals and a pressure measurement signal are accommodated entirely in the housing, without external electrical lines, which, in particular in the automotive sector, are subjected to high loads. The tire pressure adjustment apparatus can thus form a compact, reliable unit or a module that can be placed between the compressed-air supply and external connecting lines that lead to the rotary transmitters or to pneumatic devices that accommodate the rotary transmitters.

For this purpose, the rotary valve preferably has one or two internal connecting lines that connect an inlet port to one of several outlet ports. The rotary valve advantageously has a stator relative to which the positioner is rotatable. The compressed-air ports of the rotary valve, that is, the inlet and outlet ports, can be provided on the stator, such that the rotatable positioner serves merely for the selective connection of the corresponding ports of the stator. By means of such a design, the outlay in terms of hardware for forming the rotatable parts is low; the positioner, which must be adjusted mechanically, that is, for example a revolver or rotor, may basically be equipped substantially with one or more connecting lines, without more complex structure.

Thus, according to embodiments of the present invention, a rotational adjustment is intentionally selected that, by contrast to conventional solenoid valves, not only has two position states that can be set by linear adjustment but requires a rotation. In this way, it is possible to dispense with the formation of switching cascades or other hierarchical structures with a multiplicity of valves. In this case, a rotary valve is selected, as this preferably permits an adjustment in only one direction, the direction of rotation, and nevertheless a resetting movement into the initial position is possible because, in the case of a preferably symmetrical division, the initial position can be reached again after the predefined number of rotational settings. Thus, by means of a single positioning process, it is possible for multiple different rotational settings, and, in turn, an initial position, in particular neutral position or rest position, to be successively assumed by actuation. It is possible, despite the possibly greater number of settings, for the outlay in terms of hardware for adjustment purposes to be kept low.

An electric positioning drive apparatus actuated by the control device can be utilized to adjust the rotary valve into its admissible rotational settings. The electric positioning drive apparatus may for example be in the form of an electromechanical plunger that, when energized, performs a mechanical length adjustment in order to correspondingly rotate the rotary valve onward in a predefined direction of rotation. Alternatively, the drive may be provided by way of an electric stepper motor.

The rotary valve may, in different embodiments, receive and distribute a single compressed-air line or two compressed-air lines. In the case of the embodiment with a single compressed-air line, the rotary transmitters are thus actuated by way of a single pneumatic connecting line, for example with suitable pneumatic signal transmission as described in EP 1 051 302 B1, or by way of, in each case, one upstream pneumatic device that actuates a control inlet and inflation inlet of the rotary transmitter.

In the case of the embodiment with two compressed-air lines, two pneumatic lines may be formed in the rotatable positioner, such that an external control line and an external inflation line run to each rotary transmitter. In this way, a simpler design of the pneumatic devices close to the wheels is made possible, it no longer being the case that the pneumatic devices receive the pressure signals from a single pneumatic connecting line in order, from these, to successively permit an actuation of the control port and subsequently of the inflation port.

The rotatable positioner may furthermore be axially adjustable relative to the stator; in this way, an embodiment is made possible in which the rotatable positioner is remote or decoupled from the stator in the intermediate settings between the admissible rotational settings, and a pneumatic connection of the inlet port to the respective outlet port is realized only in the admissible rotational settings. For this purpose, a sliding or rolling device with axial adjustment may be provided between the stator and the rotatable positioner; the sliding or rolling device may be realized for example by way of a cam track or undulating track formed on one of the two components, and a sliding device or rolling device formed on the other component, such that, in each case, an axial offset is generated in the event of a rotation.

Between the rotatable positioner and the stator there may be mounted suitable spring devices. In one advantageous embodiment, a first spring device is provided, which separates the rotatable positioner from the stator or pushes the rotatable positioner away from the stator, and a second, opposing spring device is provided, which serves for generating a second spring force that pushes the rotatable positioner against the stator; in this case, the second spring force changes its spring strength in a manner dependent on the rotational setting. In the case of the embodiment with undulating tracks or cam tracks, the second spring device may be formed by individual springs, which are provided on an adjustable guide wheel or adjustable sliding head. The springs are thus compressed or relaxed to a greater extent in a manner dependent on the position on the cam track—peak or trough—such that, in the more intensely compressed state, the springs impart the relatively high spring force, which overcomes the opposing first spring force and leads to connection or coupling.

Furthermore, an embodiment of the rotary valve with ceramic surfaces that slide on one another may also be provided in which, for example on the stator, there is formed a pattern of holes, the individual holes being connected by connecting lines of the positioner in accordance with the rotational setting.

In the design of the rotary valve for the connection and/or distribution both of a control line and of an inflation line, it is advantageously the case that two connecting lines are formed in the rotatable positioner (or revolver or rotor). In this case, a first inlet port may be provided, for example radially in the center, that is, for example directly in the axis of rotation, and the other inlet port may be formed by an outer radial ring, such that a first connecting line connects the central hole to an inner circular ring of connection holes, and a second connecting line connects the radially outer ring to an outer circular ring of connection holes. Thus, the distribution of two lines by way of a single rotatable positioner is also possible using only one positioning drive apparatus.

The design of a rotary valve advantageously permits the integration of the pressure sensor and/or of the further valves of the pilot control valve unit, that is, of solenoid valves and pneumatic valves. In this case, bores may be formed in the stator, in which or to which the pressure sensor and/or the further valves of the pilot control valve unit are connected and/or integrated, such that a compact, reliable and robust design is made possible.

The rotary valve may be divided into six rotational settings, that is, adjusted in 60° steps. In this case, such a division permits the use of a uniform rotary valve, and possibly also of a uniform tire pressure adjustment apparatus, in different vehicles, both in two-axle and three-axle vehicles. This can cover most types of vehicle, both heavy goods vehicles and trailer vehicles, for example also agricultural vehicles such as tractors.

It is thus possible for a tire pressure modulator to be formed that, in one housing, accommodates both the rotary valve and the electric pilot-control valves between the compressed-air supply and the rotary valve. Furthermore, the electronics control unit (ECU) is advantageously also accommodated in the housing, such that electrical actuation and energization is performed entirely within the housing. External electrical lines outside the modulator housing are thus no longer necessary, whereby robustness and reliability are considerably increased.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The present invention is discussed in greater detail below with reference to the appended drawings, in which:

FIG. 5 shows further views of the rotary valve as per the embodiment depicted in FIG. 2;

FIG. 8 shows views of the distributor surface of the rotary valve of FIG. 7.

LIST OF REFERENCE CHARACTERS

Figure 1:
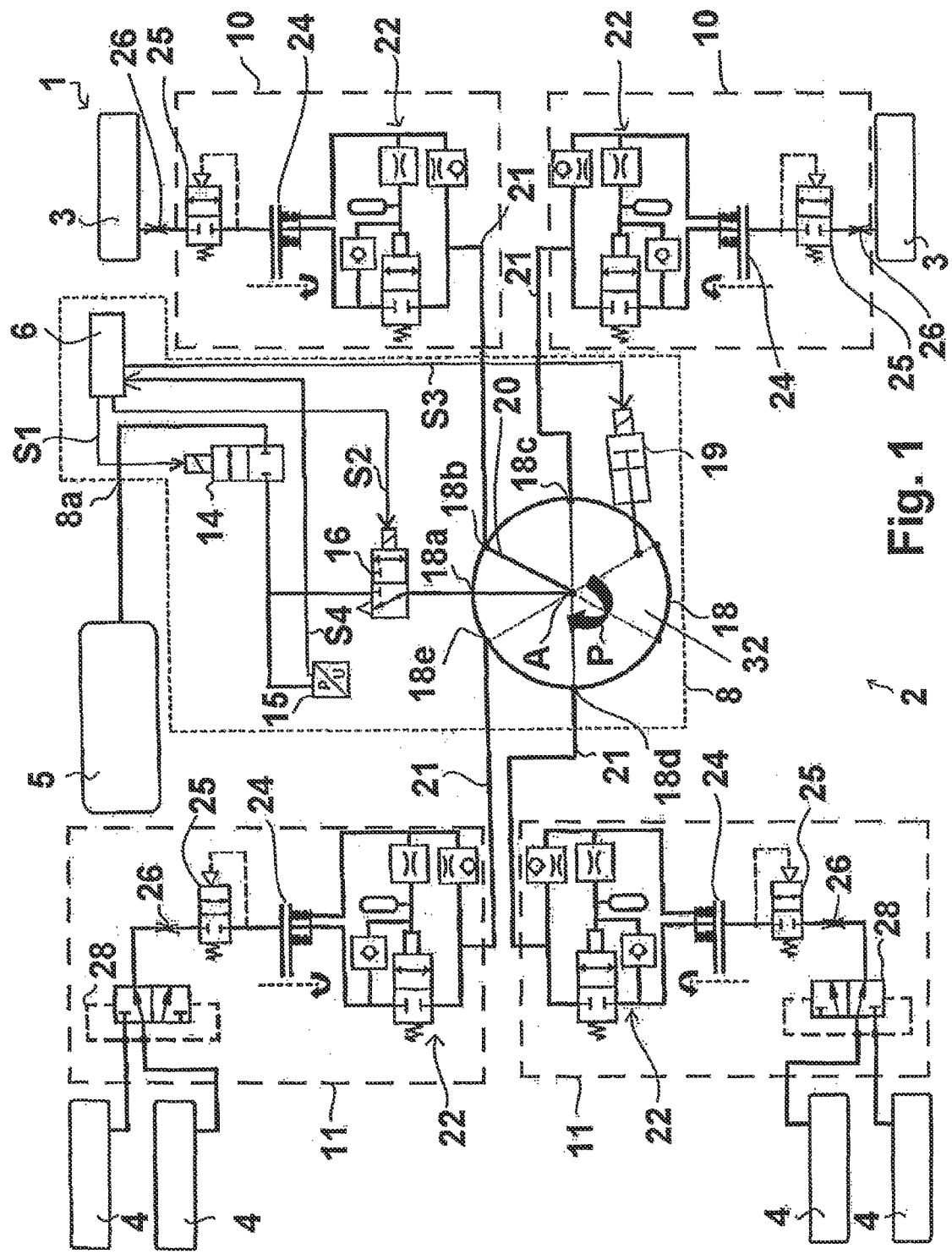
FIG. 1 shows an electropneumatic circuit diagram of a vehicle with a tire inflation system according to an embodiment of the present invention.

1 Vehicle
2 Tire inflation system
3 Front tire
4 Rear tire
5 Compressed-air supply
6 Control device
8 Tire pressure modulator
8a Compressed-air inlet/inlet port
8b Housing
10 Front pneumatic devices
11 Rear pneumatic devices
14 2/2 shut-off valve (solenoid shut-off valve)
15 Pressure sensor
16 3/2 directional valve
18 Rotary valve
18a Inlet port
18b, 18c, 18d, 18e Outlet ports
19 Positioning drive apparatus
19a Electromagnetic plunger
19b Center of rotation
19c Electromagnet
20 Internal distributor line
21 External connecting lines
22 Rotary transmitter pressure controller
24 Rotary transmitter
24a Control port of the rotary transmitter
24b Inflation port
25 Tire pressure control valve
26 Throttle
28 Select-low valve device/twin-tire control valve
30 Stator
31 Bore
32 Revolver, positioner, rotor
33 Bores
34 Annular spring, spring device
35 Bore
36 Cylinder chamber
38 Ventilation port
39 Drive surfaces
40 Guide wheels
42 Cam track
42a Elevations (peaks)
42b Depressions (troughs)
44 Guides
45 Springs, second spring device
102 Tire inflation system
108 Tire pressure modulator
116a, 116b 3/2 directional valves
118 Rotary valve
118a1 Inflation inlet port
118a2 Control inlet port
118b1 Inflation line outlet ports
118b2 Control line outlet ports
120a, 120b Internal distributor lines
121a External control line
121b External inflation line
128 Flow transfer shut-off valve
130 Stator
132 Revolver, positioner, rotor
218 Annular groove
S1, S2, S3 First, second, third control signal
S2a Control signal
S2b Control signal
S4 Pressure measurement signal
A Axis of rotation
P Arrow, direction of rotation

DETAILED DESCRIPTION OF THE PREFERRED EMBODIMENTS

FIG. 1 shows a vehicle 1 having a tire inflation system 2, front tires 3, and rear tires 4. Front tires 3 and rear tires 4 are parts of the front wheels and rear wheels and are inflated by way of the tire inflation system 2, wherein the tire pressure of the tires is advantageously regulated. The rear tires 4 are in each case dual tires or tires of dual wheels (twin tires).

The tire inflation system 2 is fed from a compressed-air supply 5, which represents a connection to a compressor or advantageously to a reservoir that is connected to a compressor. The tire inflation system 2 has a tire pressure modulator 8 (TPC modulator, tire pressure control modulator), which is outlined by dashed lines and which serves as a tire pressure adjustment device, and pneumatic devices 10 and 11, which are connected to the tire pressure modulator 8 by way of external distributor lines 21. The front tires 3 are connected to the two front pneumatic devices 10, and each of the two (twin) rear tires 4 of the dual wheels are connected to the two rear pneumatic devices 11.

The tire pressure modulator 8 is pneumatically connected by way of a compressed-air inlet 8a to the compressed-air supply 5 and has an electronic control device 6 that, internally within the tire pressure modulator 8, outputs control signals S1, S2 and S3 and receives a pressure measurement signal S4, the tire pressure modulator furthermore having a 2/2 shut-off valve (solenoid shut-off valve) 14, which is connected to the compressed-air inlet 8a and which is actuated by way of the first signal S1, and a pressure sensor 15, which is connected to the outlet of the 2/2 shut-off valve 14 and which outputs the pressure measurement signal S4. Furthermore, in parallel with the pressure sensor 15, there is connected to the outlet of the 2/2 shut-off valve 14 a 3/2 directional valve 16, which is switched by way of the second control signal S2 and which, in rest position, imparts a blocking action and, when it receives the second control signal S2, connects the inlet of the pressure sensor 15 and the outlet of the 2/2 shut-off valve 14 to an inlet port 18a of a rotary valve 18.

The rotary valve 18 is adjusted by way of an adjustment drive apparatus 19, which is actuated by way of a third control signal (positioning signal) S3. The rotary valve 18 has the inlet port 18a and four outlet ports 18b, 18c, 18d, 18e, wherein the outlet ports 18b and 18c are provided for the first pneumatic devices 10 of the front tires 3 and the outlet ports 18d and 18e are provided for the second pneumatic devices 11 of the rear tires 4. The rotary valve 18 has a stator 30 and a positioner, the revolver 32, which is rotatable relative to the stator 30 and in which there is formed an internal distributor line 20, which is connected to the inlet port 18a and which, in the various rotational settings of the revolver 32, is selectively connected to one of the outlet ports 18b, 18c, 18d, 18e. In addition to the four operating switching positions there may advantageously also be provided a rest switching position (or, as shown here, two rest switching positions), in which the internal distributor line 20 is not connected to any of the outlet ports 18b to 18e.

As can be seen from the schematic circuit diagram of FIG. 1, the outlet ports 18b, 18c, 18d, 18e are arranged so as to be distributed in the circumferential direction with the same radial spacing to an axis of rotation A; the internal distributor line 20 runs from the axis of rotation A radially outward, and in the various switching positions is connected to, in each case, one of the outlet ports 18b to 18d. The internal distributor line 20 thus constitutes a distributor finger, which is adjustable in the rotational direction about the axis of rotation A. The positioning drive apparatus 19 adjusts the revolver 32 relative to the stator 30; for a simpler mechanical design, the rotational adjustment is advantageously performed in each case in a uniform rotational direction, indicated by arrow P, and by a fixed angle of rotation. In the case of the sixfold division shown in FIG. 1, the four rotational settings for the connection of 18b, 18c, 18d, 18e and two rest positions are provided. The 60° division advantageously makes it possible for even three-axle vehicles to be equipped therewith, and thus a uniform rotary valve can be used for most heavy goods vehicles and trailers.

The positioning drive apparatus 19 thus adjusts the revolver 32 in each case through 360°/6=60°, wherein, when all of the rotational settings are run through cyclically, a corresponding number of positioning processes can be performed.

By way of the first control signal S1, the control device 6 actuates the 2/2 shut-off valve 14 so as to start an inflation process and, for this purpose, to connect the compressed-air supply 5 to the 3/2 directional valve 16. By way of the second control signal S2, the control device correspondingly actuates the 3/2 directional valve 16 so as to switch the latter from the blocking main position into a pass-through position, such that the rotary valve 18 is connected to the compressed-air supply 5. If the 3/2 directional valve 16 is actuated with the 2/2 shut-off valve 14 closed, only the pressure sensor 15 is connected to the rotary valve 18, without any influence being imparted by the compressed-air supply, thus permitting a pressure measurement of the pressure at the respectively connected outlet port 18b, 18c, 18d, 18e.

The pneumatic devices 10 and 11 each serve, when charged with compressed air by the tire pressure modulator 8 via the, in each case, one external connecting line 21, to pneumatically couple, that is, seal off, the initially decoupled tire 3 or 4 in a first step, and to subsequently permit an inflation and/or pressure measurement of the respectively connected tire 3 or 4 via the external connecting line 21 in a second step. For this purpose, the pneumatic devices 10 and 11 each have a rotary transmitter pressure controller 22, which may be of structurally identical form in all pneumatic devices 10 and 11, a downstream rotary transmitter 24, a tire pressure control valve 25, which is advantageously in the form of a flow transfer valve, and preferably a throttle 26. In the case of the use of twin wheels or dual rear tires 4, as is shown, an additional valve device is advantageously provided, in this case a select-low valve device 28 (also referred to as twin-tire control valve), which is in the form of a pneumatically double-acting 3/2 directional valve, such that the connected rear tire 4 with the relatively high pressure is connected through by the twin-tire control valve 28, in each case, such that the inlet thereof is connected to the other rear tire 4, such that automatic regulation is performed whereby it is always the tire with the relatively low pressure that is inflated. In this case, other twin-tire control valves 28, such as are known per sc, or more complex valve devices, are however correspondingly also possible.

The valves 25, 28 and the throttle 26 are thus already provided in the rotating region of the respective wheel; the rotary transmitter 24 constitutes a pneumatically actuated clutch. During the sealing-off process, the rotary transmitter pressure controller 22 connects pressure to a control port 24a of the rotary transmitter 24 in a manner known per se, whereby the sealing-off of the rotary transmitter 24 is effected, such that subsequently, the inflation can be performed via an inflation port 24b of the rotary transmitter 24, wherein the compressed air introduced during the inflation process is initially connected through by the tire pressure control valve 25, which is in the form of a flow transfer valve, and subsequently inflates the front tires 3 and/or the rear tires 4. Even during a subsequent pressure measurement, the tire pressure control valve 25 remains open, wherein the inflation port 24b also remains open.

Figure 2:
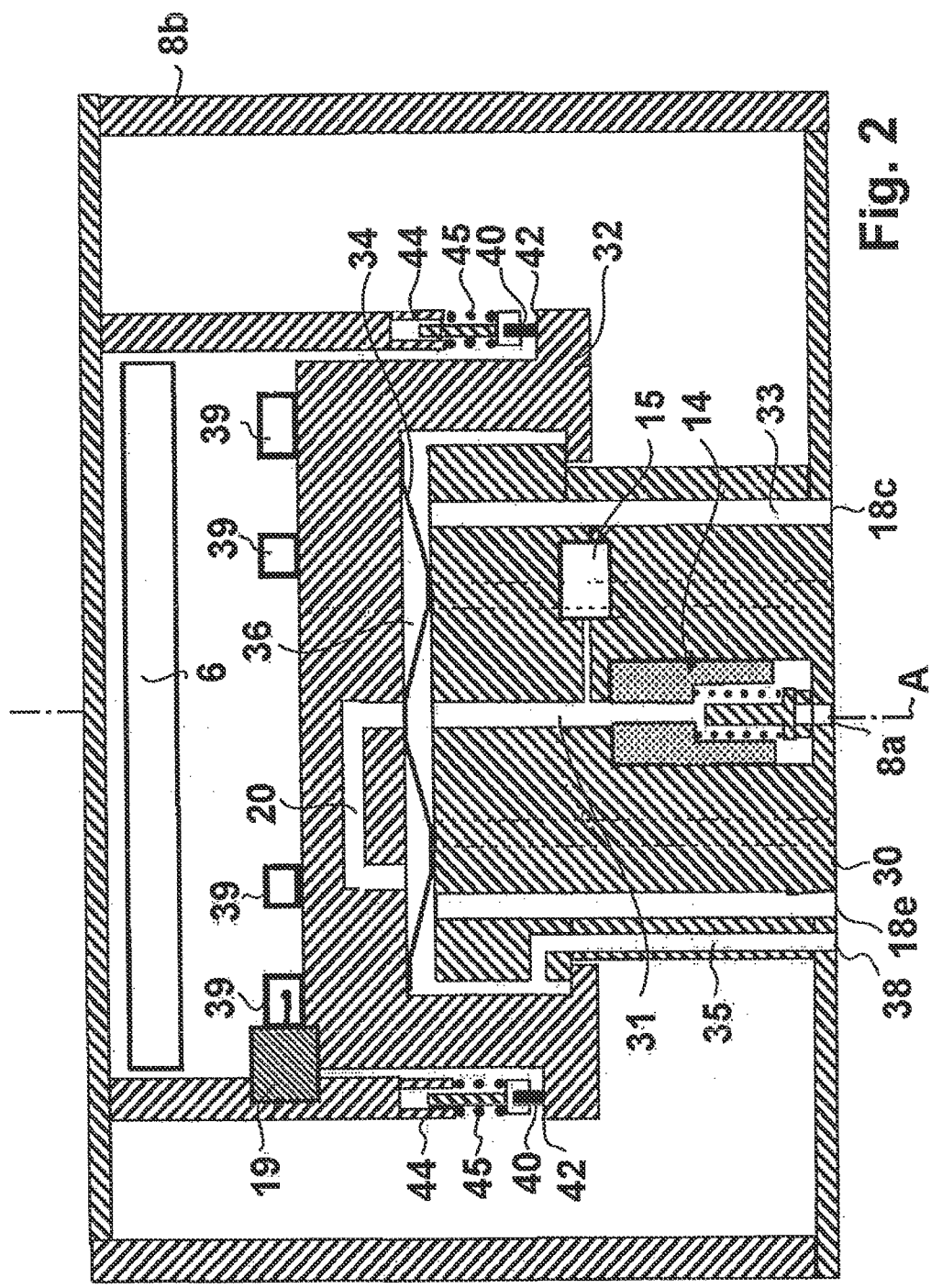
FIG. 2 shows a tire pressure adjustment apparatus of the tire inflation system according to an embodiment of the present invention, in the main position, in a section along the axis of rotation of the rotary valve.
Figure 3:
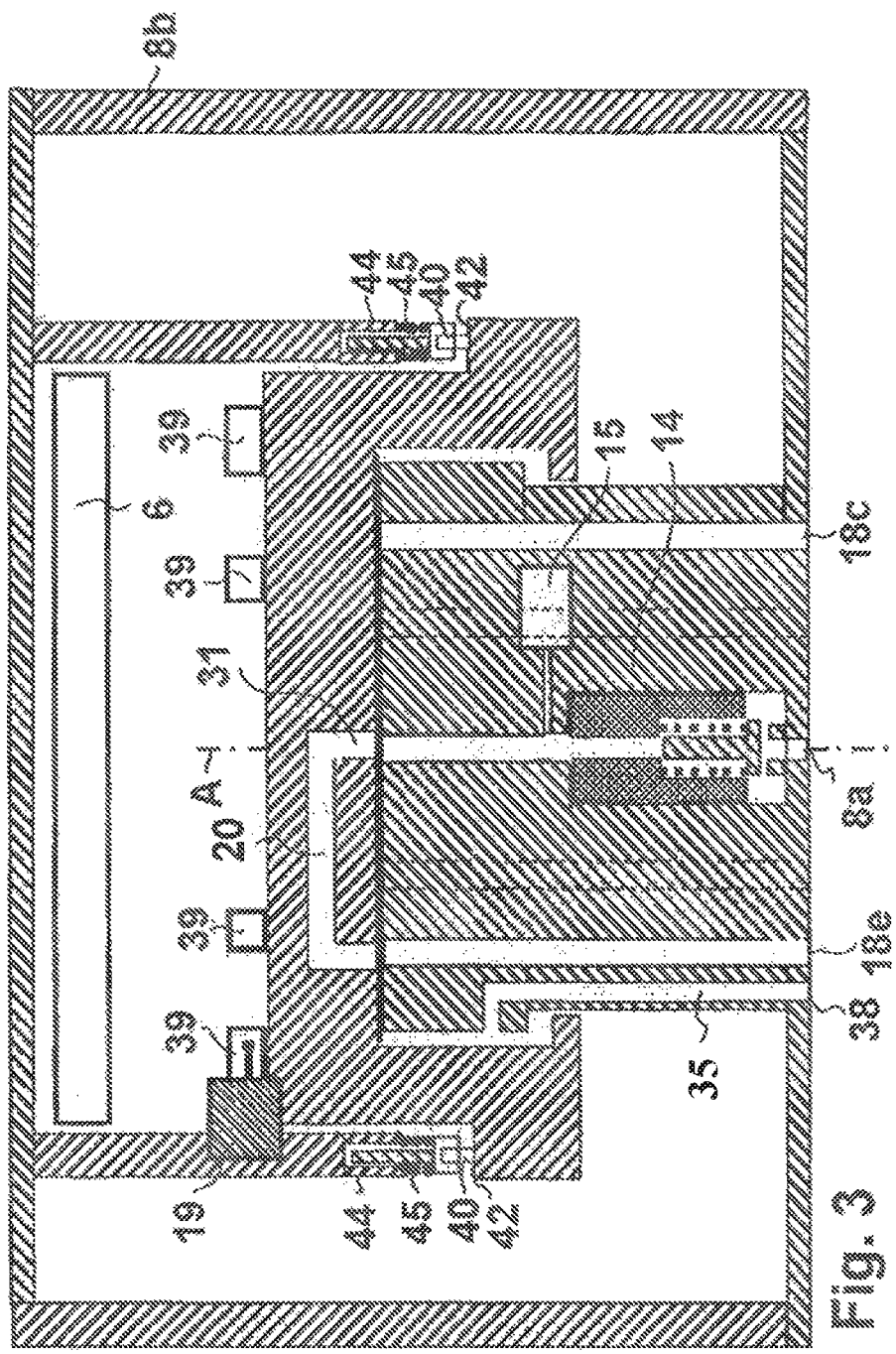
FIG. 3 is an illustration, corresponding to FIG. 2, in an aeration position.
Figure 4:
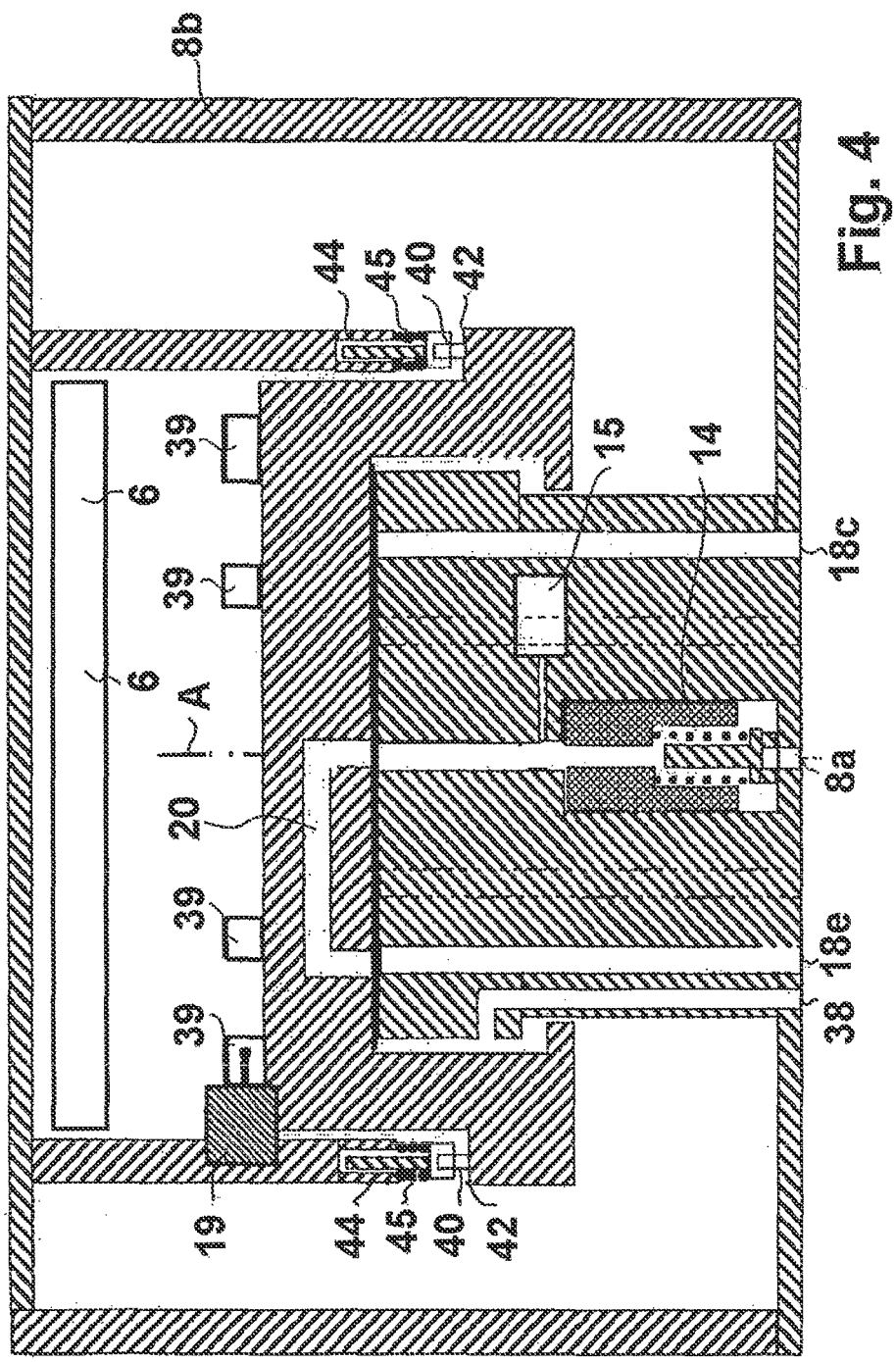
FIG. 4 is an illustration, corresponding to FIG. 2, in a tire pressure measurement position.

FIGS. 2 to 4 show, by way of example, the construction of the tire pressure modulator 8, which in this case also accommodates the control device 6, such that electrical lines run only within the housing 8b of the tire pressure modulator 8. The control device 6 (ECU) may be mounted on the housing 8b or on the inner side of a housing wall. The stator 30 is mounted fixedly in the housing 8b; the inlet port 8a is formed in the stator 30. Furthermore, the electrically actuated (solenoid) 2/2 shut-off valve 14 and the pressure sensor 15 are accommodated in or on the stator 30; a bore 31 advantageously runs along the axis of rotation A through the stator 30, such that the 2/2 shut-off valve 14 can for example be received in the bore 31, and the pressure sensor 15 can be connected to the bore 31. The stator 30 accommodates the revolver 32, which serves as positioner and in which the internal distributor line 20 is formed. Between the revolver 32 and the stator 30 there is provided a spring device in the form of an annular spring 34, which thus generates a spring preload in an axial direction, that is, in the direction of the axis of rotation A, and which, in the ventilation position shown in FIG. 2, lifts the revolver 32 from the stator 30. In the stator 30 there are furthermore formed bores 33, which run parallel to the axis of rotation A and which connect a cylinder chamber 36, which is formed between the stator 30 and the revolver 32, to the respective outlet ports 18b to 18e. In the ventilation position of FIG. 2, it is thus the case that all of the outlet ports 18b to 18e are connected via the cylinder chamber 36, and via a bore 35 running from the cylinder chamber 36 through the stator 30, to a ventilation port 38 of the rotary valve 18, which serves as compressed-air distributor, and the outlet ports are thus aerated. The compressed-air supply 5 is shut off by way of the 2/2 shut-off valve 14, which is present in its blocking rest position.

The positioning drive apparatus 19 may, for example, act, as shown, on drive surfaces 39 of the revolver 32, and is mounted on the housing.

In this embodiment of FIG. 2, coupling and decoupling of the revolver 32 in an axial direction is thus realized; for this purpose, guide wheels 40 are provided on a cam track 42 with elevations (peaks) 42a and depressions (troughs) 42b, as can be seen in FIG. 5, which shows the guide wheels 40 correspondingly in a side view. The guide wheels 40 are guided in an axial direction in guides 44 and are pushed, in each case, against the cam track 42 by second spring devices, which are in the form of springs 45, such that, as the revolver 32 rotates about the axis of rotation A and thus the cam track 42 formed on the revolver 32 rotates, the guide wheels perform spring-compression deflection movements in the axial direction. The cam track 42 is designed, or provided with an undulation, such that a coupling or pressing of the revolver 32 against the stator 30 is realized only in the admissible adjustment positions, in which the internal distributor line 20 connects the central bore 31 of the stator 30 to, in each case, one outlet port 18b to 18e.

Thus, the spring strength of the annular spring 34, which pushes the revolver 32 away from the stator 30, and thus upward in FIG. 2, and the spring strengths of the second spring devices 45, which push the revolver 32 downward in FIG. 2 and thus against the stator 30, are advantageously coordinated with one another. When the guide wheels 40 on the cam tracks 42 pass an elevation 42a, the spring devices 45 are compressed, such that the spring force imparted by them increases and, in sum total, the spring devices 45 overcome the annular spring 34; and coupling takes place.

FIG. 3 shows an aeration position or admissible adjustment position. As shown by a comparison with FIG. 5, the guide wheels 40 are, in this case, bearing against elevations 42a, whereas in FIG. 2, they are bearing against depressions 42b. In this aeration position of FIG. 3, therefore, one of the four admissible distribution settings has been assumed. By way of its cam track 42, the revolver 32 is pushed downward against the stator 30. The ventilation path via the ventilation port 38 is closed off; the 2/2 shut-off valve 14 is actuated so as to open by way of a control signal S2 from the control device 6, and connects the compressed-air supply 5 via the open 2/2 shut-off valve 14 and the bore 31 of the stator 30, the internal distributor line 20 in the revolver 32, and the bore 33, which is relevant in this case, to the desired outlet port 18b to 18e, and thus via a respective pneumatic device 10 or 11 to a front tire 3 or rear tire 4.

Opening and closing are thus performed by way of the cam track 42 and the guide wheels 40. The actuation with the positioning drive apparatus 19, that is, of the revolver drive, by way of the control signals S3 is coupled to the transmission of the second control signal S2 to the 2/2 shut-off valve 14.

Following inflation, in each case, one tire pressure measurement is performed in the tire pressure measurement position of FIG. 4, in which the revolver 32 is not adjusted relative to the inflation position of FIG. 3, that is, remains in its respective rotational setting; thus, no control signal S3 is output. By contrast, by way of the second control signal S2, the 2/2 shut-off valve 14 is closed, such that the compressed-air supply 5 is shut off. Thus, the pressure sensor 15 remains connected via the bore 31, the internal distributor line 20, the respective bore 33 and an unchanged rotary transmitter pressure controller 22, and further unchanged valves 25 and possibly 28, to the respective front tire or rear tire 4, such that the pressure sensor 15 can thus perform a pressure measurement and thus outputs a pressure measurement signal S4 to the control device 6. The ventilation path via the ventilation port 38 thus remains blocked.

The plan view of FIG. 5 shows a design of the positioning drive apparatus 19, which, in this case, is provided in the form of an electromagnetic plunger 19a, which is mounted at a center of rotation 19b and which, when it receives a control signal S3, is attracted by an electromagnet 19c (for example counter to the action of a spring) such that the electromagnetic plunger is pivoted about its center of rotation 19b and, during adjustment, actuates, in each case, one of the drive surfaces 39, that is, pivots the revolver 32 in the direction of rotation indicated by the arrow P. In the case of the cam track design, an adjustment from a depression 42b to an elevation 42a or slightly beyond the latter can be sufficient, such that subsequently the guide wheel 40 rolls down, under the relaxation action of its spring device 45, into the following depression 42b.

Other electrically actuated adjustment drive devices 19 are basically also possible.

Figure 6:
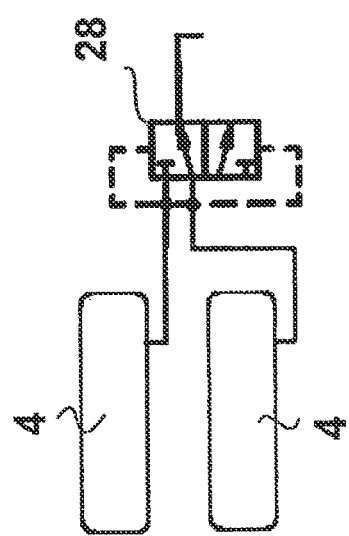
FIG. 6 is an illustration of a select-low valve for use with twin tires in accordance with an embodiment of the present invention.

FIG. 6 shows a select-low valve device 28. That rear tire 4 of the twin-tire system, which is at the lower pressure, is always automatically connected. In the event of line leakage or a tire defect, the intact tire is automatically protected, as it is shut off by the select-low valve device 28 formed as flow transfer valve. By means of a defined switching hysteresis, for example of 0.1 bar, it can be ensured that, in the event that both rear tires 4 are at the same pressure, no high-frequency oscillation of the select-low valve device 28 can occur.

Figure 7:
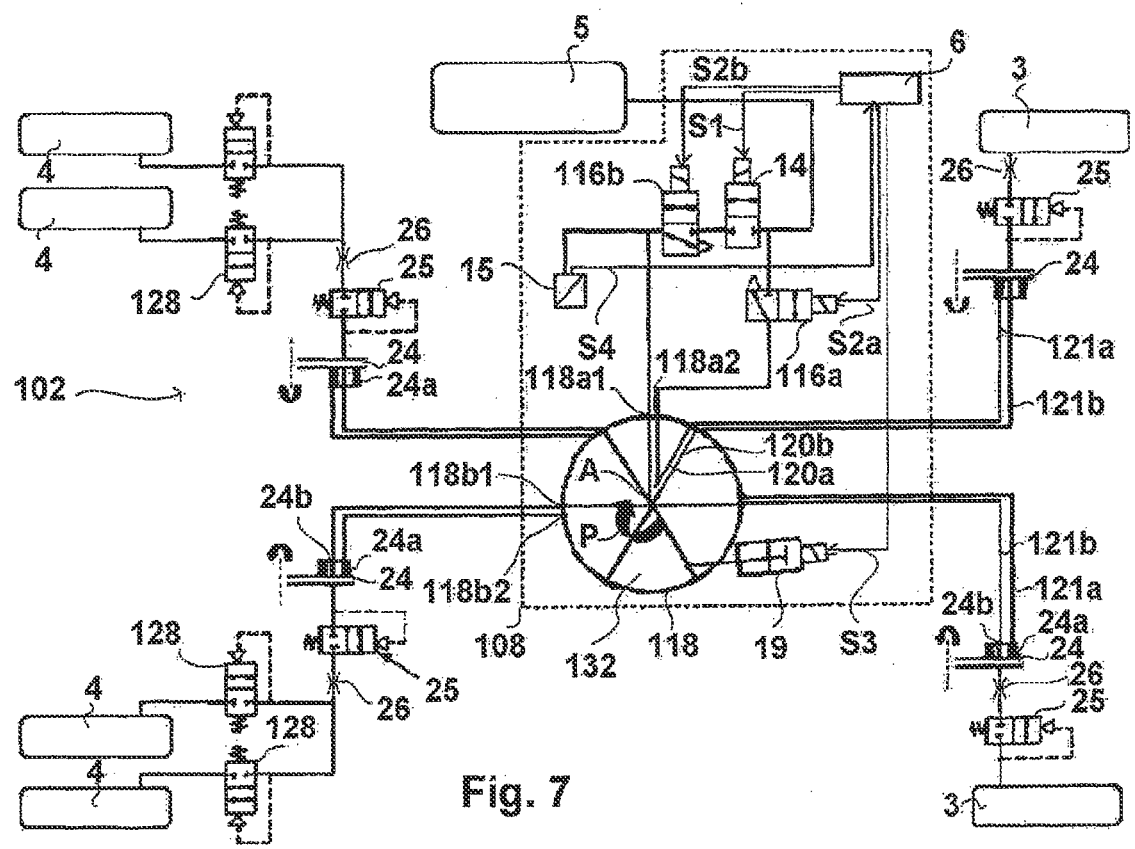
FIG. 7 is an electropneumatic circuit diagram of a vehicle with a tire inflation system according to a further embodiment of the present invention with distribution of control pressure and pressure.

FIG. 7 shows a further embodiment of a tire inflation system 102, in which identical or similar elements are denoted by the same or similar reference signs to those in FIG. 1. In this embodiment, two-stage actuation of the rotary transmitter 24 is no longer necessary; instead, by way of the tire inflation pressure modulator 108, an external control line 121a and an external inflation line 121b are actuated separately. For this purpose, in the revolver 132, there are provided two internal distributor lines 120a and 120b, which are adjusted, in each case, in parallel or simultaneously. For this purpose, the tire pressure modulator 108 has two 3/2 directional valves 116a and 116b, which are actuated by way of control signals S2a, S2b of the control device 6. By way of the 3/2 directional valve 116a, the compressed-air supply 5 is connected directly to the control inlet port 118a2 of the rotary valve 118, and via the internal distributor line 120a in the respective switching position to a control line 121a and to the control port 24a of the respective rotary transmitter 24, whereby sealing (coupling) is thus realized; subsequently, the first control signal S1 is output to the 2/2 shut-off valve 14, and outputting of the control signal S2b causes the further 3/2 directional valve 116b to be opened, such that the rotary valve 118 is supplied with compressed air by way of its inflation inlet port 118a1 and—with unchanged rotational setting or switching position—outputs compressed air via the internal distributor line 120b and an external inflation line 121b to the inflation port 24b of the rotary transmitter 24.

The front tires 3 are, in turn, connected via a tire pressure control valve 25, in the form of a simple flow transfer valve (2/2 flow transfer shut-off valve), and possibly a throttle 26, to the rotary transmitter 24. The valve configuration at the rear tires 4 may correspond. In the embodiment shown, a flow transfer valve 128 is provided by way of the tire pressure control valve 25 and the throttle 26 in parallel for each rear tire 4 of a twin tire; it is basically also possible here for some other valve configuration to be provided for the rear tires 4.

In the embodiment of FIG. 7, therefore, the rotary transmitter pressure controller 22 of FIG. 1 is omitted, because owing to the parallel transfer of the two external connecting lines 121a and 121b, that is, of the control line 121a and the inflation line 121b, correspondingly direct actuation of the ports 24a and 24b of the rotary transmitter 24 is possible. It is basically also possible in the embodiment of FIG. 7 for coupling and decoupling to be realized by way of a cam track or some other axial adjustment.

Advantageously, the revolver 132 is in the form of a ceramic revolver, which bears against a ceramic surface; a design without or with axial adjustment may be provided. In FIG. 8, bores or ports are provided in a stellate pattern in the stator 130; a central port is provided as an inflation line inlet port 118a1 in the center of the stator 130; by contrast, the control inlet port 118a2 is provided eccentrically and is connected to an annular groove 218. Furthermore, in the stator 130, inflation line outlet ports 118b1 are provided on an inner circular path, to which inflation line outlet ports the external inflation lines 121b are connected, and control line outlet ports 118b2 are provided on an outer circular path, to which control line outlet ports, in each case, one external control line 121a is connected.

The internal distributor lines 120a and 120b are provided in the revolver 132 as per FIG. 8; the internal distributor line 120b serves for the connection of the central inflation line inlet port 118al to an inflation line outlet port 118b1 formed on the inner circular path. Correspondingly, the internal distributor line 120a serves to connect, in each case, the outer control inlet port 118a2 to a control line outlet port 118b2 provided on an outer circular path. Thus, the two internal distributor lines 120a and 120b can, in each case, connect corresponding ports to one another simultaneously.

Thus, in the embodiment of FIGS. 7 and 8, the following steps of the inflation and measurement process are performed:

Proceeding from the rest position, inflation is performed in that, firstly, by way of the control signal S3, a corresponding position of the revolver 132 is set such that the respective front tire 3 or rear tire 4 is connected. Subsequently, by way of the control signal S2a, the 3/2 directional valve 16a for the control line is opened, and thus the control port 24a is aerated via the external control line 121a on the respective rotary transmitter 24, and thus a sealing action is applied. Subsequently, the first control signal S1 and the control signal S2b are output simultaneously or successively, and thus compressed air is output via the external inflation line 121b and the rotary transmitter 24 and the opening tire pressure control valve 25 to the respective tire 3 or 4.

For the measurement of the pressure, the control signal S2a continues to be output. The first control signal S1 is deactivated, such that the 2/2 shut-off valve 14 assumes a blocking position. By way of the external inflation line 121b, a pressure measurement by means of the pressure sensor 15 can thus be performed.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A tire pressure adjustment apparatus for a vehicle tire inflation system for distributing compressed-air to a pneumatic devices having a rotary transmitter and for measuring tire pressures of at least one vehicle tires connected to the rotary transmitter of the pneumatic device, the tire pressure adjustment apparatus comprising:

a control device configured to receive a pressure measurement signal and to output control signals; and a modulation valve device configured to receive the control signals and to pneumatically actuate the rotary transmitter of the pneumatic device for inflation and pressure measurement of the at least one vehicle tire connected to the rotary transmitter of the pneumatic device, the modulation valve device having a rotary valve including a positioner configured to actuate the pneumatic device, the positioner being rotatable into multiple rotational settings.

2. The tire pressure adjustment apparatus as claimed in claim 1, wherein the modulation valve device includes at least one electropneumatic pilot control valve between the rotary valve and a compressed-air supply port, wherein the rotary valve, the at least one electropneumatic pilot control valve, a pressure sensor for generating the pressure measurement signal, and the control device are housed in a common housing, and wherein electrical control lines for transmitting the pressure measurement signal and the control signals run in the common housing.

3. The tire pressure adjustment apparatus as claimed in claim 1, wherein the rotary valve includes at least one inlet port, multiple outlet ports, and at least one internal distributor line in the positioner and connecting the at least one inlet port to at least one of the multiple outlet ports in at least one of the multiple rotational settings.

4. The tire pressure adjustment apparatus as claimed in claim 3, wherein the rotary valve includes a stator and a positioning drive apparatus, the positioning drive apparatus being actuatable by a control signal of the control signals output by the control device and configured to cause the positioner to rotate relative to the stator, wherein the at least one inlet port and the multiple outlet ports are in the stator, and wherein the positioner is received one of on and in the stator so as to be rotatable about an axis of rotation.

5. The tire pressure adjustment apparatus as claimed in claim 4, wherein the at least one inlet port of the stator is in the axis of rotation, and wherein the multiple outlet ports are on at least one circular path.

6. The tire pressure adjustment apparatus as claimed in claim 5, wherein the at least one inlet port includes a radially inner, first inlet port and a second inlet port arranged on an outer circular path situated radially outside ones of the multiple outlet ports, and wherein holes are defined in the positioner for connection of the ones of the multiple outlet ports and of the at least one inlet port.

7. The tire pressure adjustment apparatus as claimed in claim 4, wherein multiple bores are defined in the stator, and wherein the modulation valve device includes a pressure sensor and pilot control valves disposed between a compressed air supply port and the rotary valve, the pressure sensor and the pilot control valves being accommodated in the stator and connected to the bores.

8. The tire pressure adjustment apparatus as claimed in claim 4, wherein the positioning drive apparatus is configured to rotate the positioner in only one direction of rotation and by a fixed angle of rotation.

9. The tire pressure adjustment apparatus as claimed in claim 8, wherein the positioning drive apparatus is an electromagnetic plunger.

10. The tire pressure adjustment apparatus as claimed in claim 4, wherein the positioner is adjustable relative to the stator in an axial direction along the axis of rotation and is separated from the stator in intermediate settings between the multiple rotational settings.

11. The tire pressure adjustment apparatus as claimed in claim 10, further comprising:
   a spring-preloaded slider or roller between (i) the positioner and (ii) the stator or a housing, the spring-preloaded slider or roller being configured to adjust the positioner in the axial direction based on a rotational setting of the positioner;
   a first spring device configured to generate a first spring force to move the positioner away from the stator; and
   a second spring device configured to generate a second spring force to move the positioner against the stator,
   wherein the second spring force is dependent on the rotational setting of the positioner such that, in the multiple rotational settings, the second spring force is greater than the first spring force, and in the intermediate settings, the second spring force is less than the first spring force.

12. The tire pressure adjustment apparatus as claimed in claim 11, wherein the second spring device is on a cam track.

13. The tire pressure adjustment apparatus as claimed in claim 4, wherein inlet ports and outlet ports are defined in the stator, the inlet ports and outlet ports being selectively connected to one another by the at least one internal distributor line formed in the positioner.

14. The tire pressure adjustment apparatus as claimed in claim 13, wherein at least one of the positioner and the stator has a ceramic surface for sliding adjustment of the positioner on the stator without axial offset.

15. A tire inflation system comprising:
   a tire pressure adjustment apparatus for a vehicle tire inflation system for distributing compressed-air to multiple pneumatic devices each having a rotary transmitter and for measuring tire pressure of one or more vehicle tires each connected to at least one rotary transmitter of the multiple pneumatic devices, the tire pressure adjustment apparatus comprising:
      a control device configured to receive a pressure measurement signal and to output control signals; and
      a modulation valve device configured to receive the control signals and to pneumatically actuate at least one rotary transmitter of the multiple pneumatic devices for inflation and pressure measurement of at least one of the one or more vehicle tires, the modulation valve device having a rotary valve including a positioner configured to actuate at least one of the multiple pneumatic devices, the positioner being rotatable into multiple rotational settings,
   wherein each rotary transmitter of the multiple pneumatic devices is connected to at least one of the one or more vehicle tires.

16. The tire inflation system as claimed in claim 15, further comprising:
   an external connecting line between the rotary valve and each of the multiple pneumatic devices, and
   wherein each of the multiple pneumatic devices has a rotary transmitter pressure controller for successive actuation of (i) a control port of a corresponding rotary transmitter for sealing-off and coupling and (ii) an inflation port of the corresponding rotary transmitter for at least one of inflating at least one of the one or more vehicle tires and tire pressure measurement.

17. The tire inflation system as claimed in claim 15, further comprising:
   a control line for a control port of a rotary transmitter of at least one of the multiple pneumatic devices; and
   a pressure and measurement line to an inflation port of a rotary transmitter of at least one of the multiple pneumatic devices,
   wherein the rotary valve has two inlet ports and, for each rotary transmitter of the multiple pneumatic devices, two outlet ports, and
   wherein the positioner has two internal distributor lines.

18. A vehicle, comprising:
   multiple vehicle tires; and
   a tire pressure adjustment apparatus for a vehicle tire inflation system for distributing compressed-air to a pneumatic device having a rotary transmitter and for measuring tire pressure of at least one of the multiple vehicle tires, the tire pressure adjustment apparatus comprising:
      a control device configured to receive a pressure measurement signal and to output control signals; and
      a modulation valve device configured to receive the control signals and to pneumatically actuate the rotary transmitter of the pneumatic device for inflation and pressure measurement of the at least one vehicle tire connected to the rotary transmitter of the pneumatic device, the modulation valve device having a rotary valve including a positioner configured to actuate the pneumatic device, the positioner being rotatable into multiple rotational settings,
   wherein the rotary transmitter selectively connects one tire of the multiple vehicle tires or one pair of tires of the multiple vehicle tires to the tire pressure adjustment apparatus.

* * * * *